S. MILLS.
Car Coupling.
No. 77,071. Patented April 21, 1868.
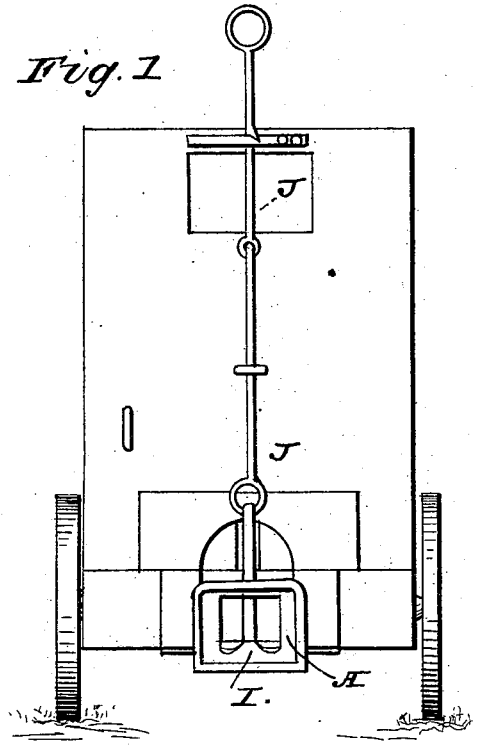
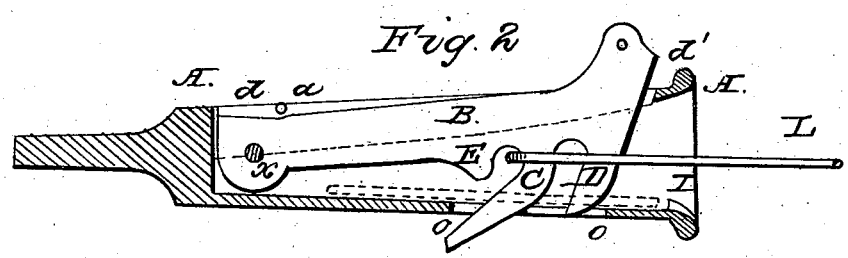
witnesses
V. D. Stockbridge
C. H. Blue Jr
Inventor
Simeon Mills
by
Alexander Mason
atty

United States Patent Office.

SIMEON MILLS, OF MADISON, WISCONSIN.

Letters Patent No. 77,071, dated April 21, 1868.

IMPROVED CAR-COUPLING.

The Schedule referred to in these Letters Patent and making part of the same.

TO ALL WHOM IT MAY CONCERN:

Be it known that I, SIMEON MILLS, of Madison, in the county of Dane, and in the State of Wisconsin, have invented an Automatic Draught-Iron for Connecting or Coupling Railroad-Cars; and I do hereby declare that the following is a full, clear, and exact description thereof, reference being had to the accompanying drawings, and to the letters of reference marked thereon.

In the annexed drawings, making part of this specification, A represents the draw-head of a railroad-car, which is constructed with a flaring mouth, as is customary. The lower side of this mouth has cast upon it a lug or projection, which is bevelled on its front, but forms a square shoulder at its back side. Upon each side of this lug or projection, which stands in a central position, are recesses or grooves, in which the sides of the link lie when drawing. This draw-head is cast with a long slot from $d$ to $d'$ in its upper side, and with a shorter slot, as seen, from $o$ to $o$, in its lower side.

B represents a draw-bar, which is placed in the long slot in the upper side of the draw-head, and is there pivoted, as shown, near its rear end at $x$. A pin, $a$, passes through the draw-head above the bar, a short distance from the pivot $x$, to keep the forward end of the bar from rising too high. Cast or formed upon the under edge of the bar, near its forward end, are two hooks, C and D, of unequal lengths, and the lower ends of which project through the slot in the under side of the draw-head when the forward end of the bar is down in drawing position. Back of the hook C is a lug, E, which keeps the link from moving backward when the cars are being coupled. Before the bar B is pivoted in the draw-head, the link L has its inner end caught by the hook C; then, when the bar is secured in its place, the pin $a$ keeps its forward end from rising high enough to allow the link L to be drawn out, so that when a link has once been confined in this way in the draw-head, it cannot be removed without first removing the bar B from its position, and it is thus prevented from being stolen or lost.

Sufficient room is left beneath the bar B to allow the link to be shoved back its entire length when not needed, so that its forward end will strike or lie against the lug or projection I. Thus, when a link is not in use, it lies out of the way upon the bottom of the opening in the draw-head, and is prevented from jolting out by the lug I.

Each draw-head is provided with a link, but as only one link can be used to couple two heads, one of the links is pushed back into the head, as shown in red lines, fig. 2, while the other link enters the draw-head and catches under the hook D. When the cars are drawing, or coupled together, one end of the link is caught by hook C of one draw-bar, and by hook D of the other.

This is a self-coupler. A hole may be made in the forward end of the bar B, and a jointed rod, J, connected to it. This rod may run to the top of the car, for uncoupling by, when desirable, from that position.

Having thus fully described my invention, what I claim as new, and desire to secure by Letters Patent, is—

The draw-bar B, secured in the draw-head A, in the manner specified, and provided with the hooks C and D, and lug E, as and for the purpose specified.

In testimony that I claim the foregoing, I have hereunto set my hand, this 30th day of December, 1867.

SIMEON MILLS.

Witnesses:
 JOHN BROWN,
 C. H. BLUE.